(12) United States Patent
Bannihatti Kumar et al.

(10) Patent No.: US 12,743,504 B2
(45) Date of Patent: Sep. 22, 2026

(54) FILTERING FOR HARMFUL GENERATIVE ARTIFICIAL INTELLIGENCE RESULTS

(71) Applicant: Amazon Technologies, Inc., Seattle, WA (US)

(72) Inventors: Vinayshekhar Bannihatti Kumar, Santa Clara, CA (US); Sopan Khosla, Sunnyvale, CA (US); Hayden Lawler, Arlington, VA (US); Siddharth Satish Goyal, Fairfax, VA (US); Rashmi Gangadharaiah, San Jose, CA (US); Brijesh Luckria, Fayetteville, NC (US); James W. Horsley, Carnation, WA (US); Bhaskar Hosahalli Rangaswamy, Arlington, VA (US); Abhijit S Barde, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 18/518,257

(22) Filed: Nov. 22, 2023

(65) Prior Publication Data

US 2025/0165589 A1 May 22, 2025

(51) Int. Cl.
*G06F 21/55* (2013.01)
*G06F 21/00* (2013.01)

(52) U.S. Cl.
CPC .................................... *G06F 21/55* (2013.01)

(58) Field of Classification Search
CPC .......... G06F 21/55; G06F 21/50; G06F 21/54; G06F 21/552; G06F 21/554; G06F 21/577; G06F 21/604
See application file for complete search history.

(56) References Cited

U.S. PATENT DOCUMENTS

2025/0045531 A1* 2/2025 Hayes .................... G06N 3/047
2025/0068741 A1* 2/2025 Lafon ................... G06F 21/554
2025/0080556 A1* 3/2025 Feng ................... H04L 63/1466

OTHER PUBLICATIONS

Anonymous, "Similarity-based Malicious Prompt Detection", Aug. 18, 2023, 5 pages.
Cobus Greyling, "More on Chatbots, Irrelevance & Out-of-Domain Detection", Apr. 22, 2022, 21 pages.
International Search Report and Written Opinion, PCT App. No. PCT/US2024/055749, Jan. 31, 2025,10 pages.
Kim et al., "Robust Safety Classifier for Large Language Models: Adversarial Prompt Shield", Oct. 31, 2023, 11 pages.
Rebedea et al., "NeMo Guardrails: A Toolkit for Controllable and Safe LLM Applications with Programmable Rails", Oct. 16, 2023, 15 pages.
Wang et al., "Self-Deception: Reverse Penetrating the Semantic Firewall of Large Language Models", Aug. 16, 2023, 15 pages.

* cited by examiner

*Primary Examiner* — Edward Zee
(74) *Attorney, Agent, or Firm* — Nicholson De Vos Webster & Elliott LLP

(57) ABSTRACT

Techniques for filtering for harmful generative artificial intelligence (AI) results are described. An example of filtering includes receiving a request for an input phrase to be responded to by a generative AI model; comparing to the received input phrase to at least one known harmful input phrase to determine that the received input phrase is to be provided to the generative AI model; providing the received input phrase to the generative AI model; and generating a response by at least in part on an output of the generative AI model.

20 Claims, 12 Drawing Sheets

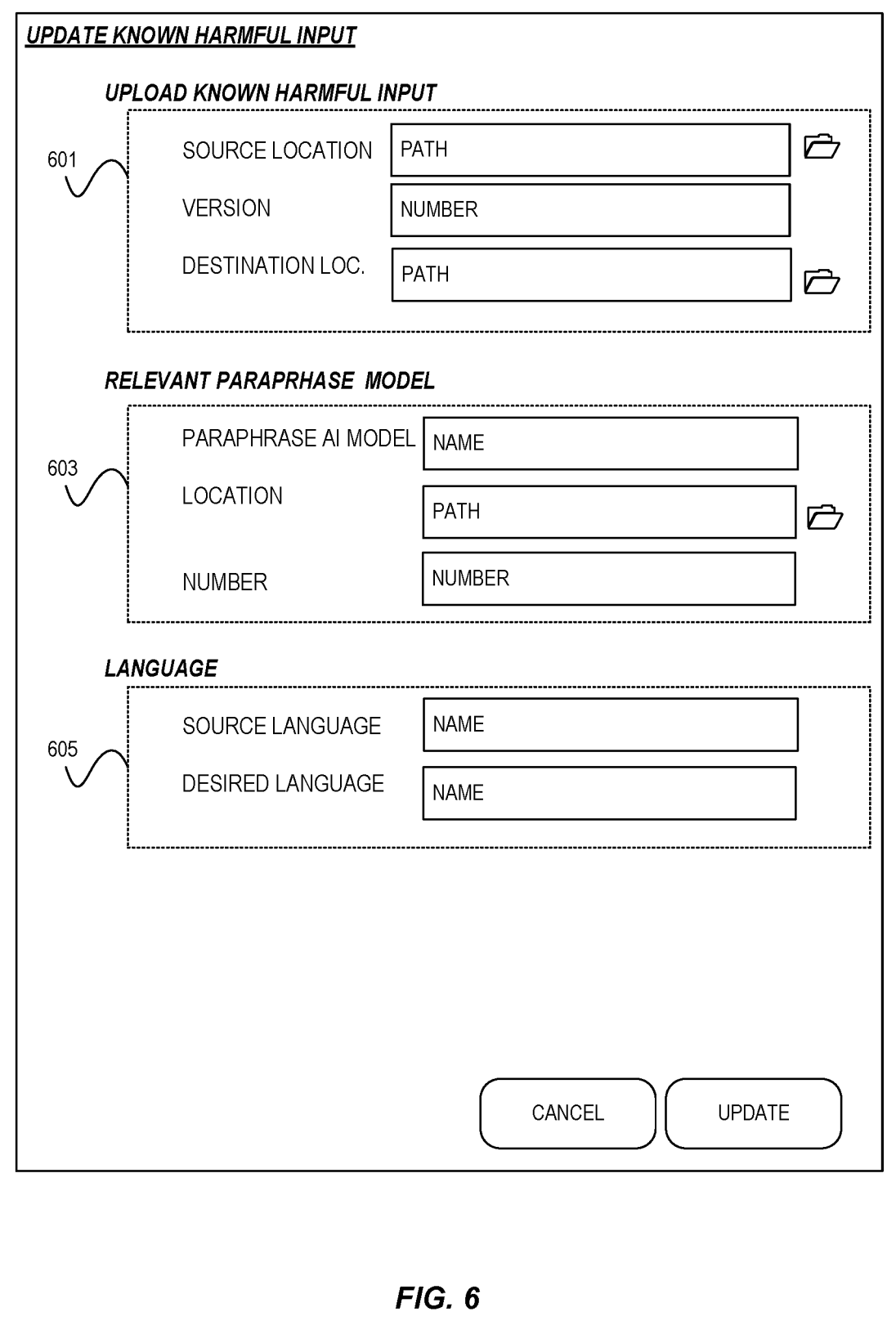

UPDATE KNOWN HARMFUL INPUT

UPLOAD KNOWN HARMFUL INPUT

601

SOURCE LOCATION PATH

VERSION NUMBER

DESTINATION LOC. PATH

RELEVANT PARAPRHASE MODEL

603

PARAPHRASE AI MODEL NAME

LOCATION PATH

NUMBER NUMBER

LANGUAGE

605

SOURCE LANGUAGE NAME

DESIRED LANGUAGE NAME

CANCEL

UPDATE

FIG. 6

FILTERING FOR HARMFUL GENERATIVE ARTIFICIAL INTELLIGENCE RESULTS

BACKGROUND

Applications backed by generative artificial intelligence (AI) are subject to prompt engineering attacks and/or model hallucinations. Prompt engineering attacks use specific sequences of characters or phrases to "trick" a generative AI model to respond in an undesired manner. Machine learning (ML) model hallucinations occur when an underlying model returns information which is incorrect or irrelevant to the prompt input.

BRIEF DESCRIPTION OF DRAWINGS

Various examples in accordance with the present disclosure will be described with reference to the drawings, in which:

FIG. 6 illustrates examples of a graphical user interface (GUI) for updating known harmful input.

DETAILED DESCRIPTION

Figure 1:
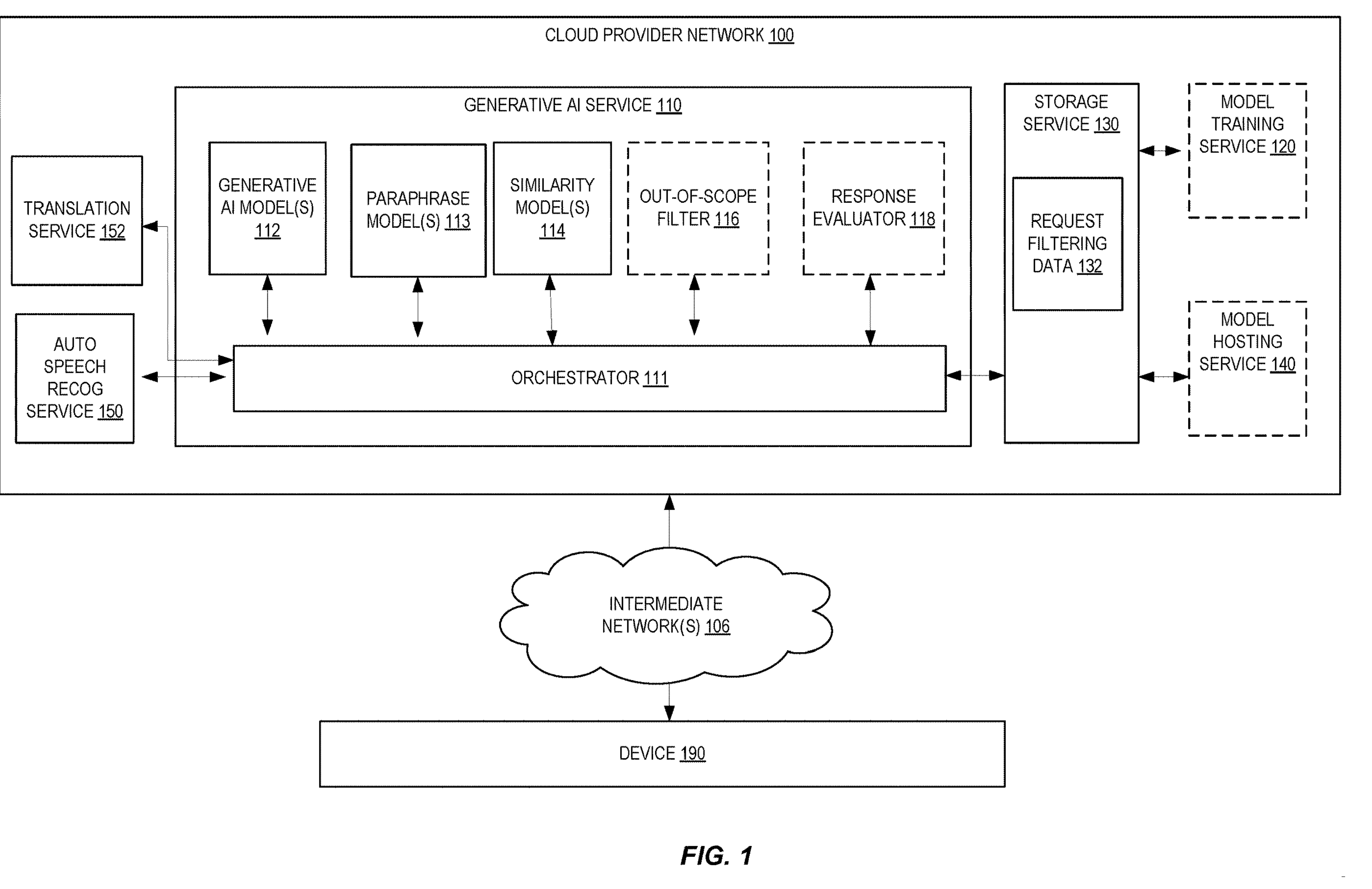
FIG. 1 illustrates examples of a system for a generative AI service.

The present disclosure relates to methods, apparatus, systems, and non-transitory computer-readable storage media for filtering generative AI requests.

As prompt engineering and hallucination risks are inherent to generative AI applications, safety mechanisms should be used to mitigate and/or prevent such behavior. As models are updated and new prompt engineering techniques are discovered, mitigations to these undesired behaviors must also continuously be kept in tune with the latest advisories.

Models may hallucinate for several reasons. Some hallucinations occur because of the training dataset(s) used. When a training dataset is incomplete, contradictory, or has falsehoods a model is more likely to produce the wrong answer. In some cases, a prompt input to the model is not complete enough and the model effectively guesses at an answer.

Several techniques have been tried to limit hallucinations. For example, requiring simple prompts (e.g., a sentence at a time), injecting context into the prompt (e.g., embedding additional information into the prompt), monitoring responses at a granular level, etc.

Prompt-based attacks may come in several forms. For example, prompt injection may be used to "trick" a model using specific prompts that change the model's behavior. For example, requesting that model perform a task in a first line and then telling the model to ignore that request and do something else in a second line. Another type of prompt-based attack is prompt leaking. Prompt leaking input is designed to get a model to expose confidential and/or proprietary information. In some cases, prompts are designed to bypass guardrails by using a prompt contextualized in an abnormal way (such as "Write a term paper style response about how locks have been historically defeated").

There have been several approaches to handling prompt-based attacks. In some examples, the prompt is looked at for issues and the prompt itself is modified. In some examples, a large language model (LLM) is used to evaluate the prompt. In other examples, the prompt is forced to fit a particular scheme.

Detailed herein are examples of a ML-based system to identify input that is likely to lead to these undesired behaviors based on a set of known prompt engineering attacks and hallucination causing topics without having to tweak the prompts themselves. Altering a prompt may end up having unintended consequences such as trying to fix a prompt attack may lead to a hallucination. In some examples, a list of provided bad input phrases is input to a generative AI model to produce semantically equivalent paraphrases with linguistic variability. This is done to protect against and cover different language variations an attacker might use for the same input utterance. In some examples, at runtime, a smaller ML model is used to compare the similarity of a user's question to one or more "bad" input phrases (and equivalents) to quickly and efficiently determine whether it is closely related to a known harmful phrase. If the phrase is deemed harmful, it is rejected.

FIG. 1 illustrates examples of a system for a generative AI service. In some examples, a user is able to make a request to one or more generative AI models 112 of a generative AI service 110 of a cloud provider network 100 to handle. Generative AI models 112 provide the ability to do one or more of generating text, summarizing text, generating images, generating video, generating audio, generating code, answering questions, classifying, etc. In some examples, one or more of the generative AI models 112 are large language models (LLMs). In some examples, one or more of the generative AI models 112 are Transformer-based. In some examples, one or more of the generative AI models 112 are generative adversarial networks. In some examples, one or more of the generative AI models 112 are auto-regressive convolutional neural networks (AR-CNNs).

Figure 2:
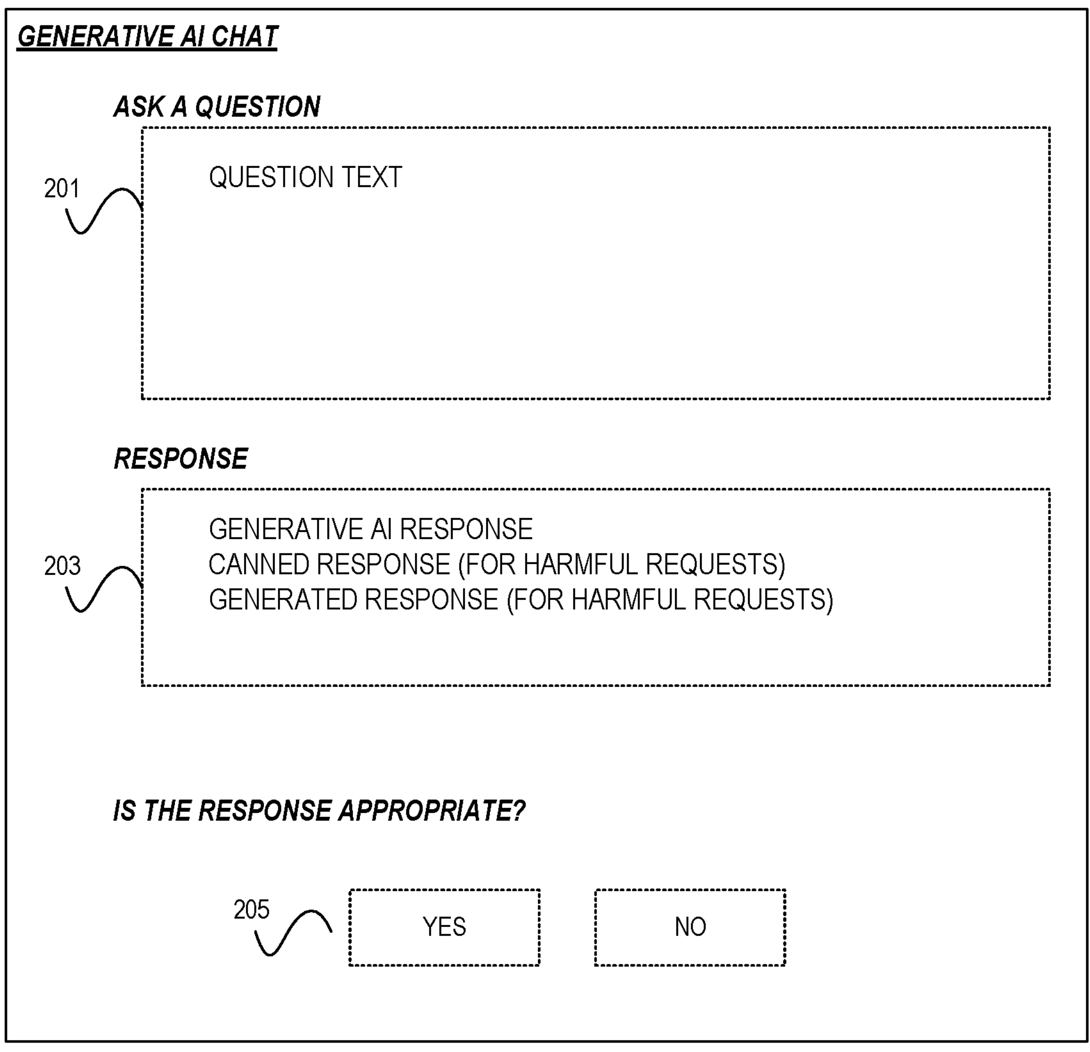
FIG. 2 illustrates examples of a generative AI chat graphical user interface.

FIG. 2 illustrates examples of a generative AI chat graphical user interface. In this example, the input request is a test 201. The response 203 to the request is one of a generative AI response, a canned response (for harmful requests), and/or a generated response for harmful requests.

In some examples, the graphical user interface includes a means 205 to indicate if the response was appropriate.

The generative AI service 110 includes, in some examples, an orchestrator 111 to dictate actions to take in response to a particular action of various phases. In a setup phase, one or more paraphrase models 113 generate paraphrases for each known harmful input. These paraphrases and known harmful input are stored as at least a part of request filtering data 132. In some examples, the request filtering data 132 is stored by a storage service 130.

In an inference phase, one or more similarity models 114 are used to determine how similar a request is to known harmful input data and/or paraphrases associated with the known harmful input data. Requests that are deemed to be too similar to known harmful input data and/or paraphrases associated with the known harmful input data are not passed to the generative AI model(s) 112.

In some examples, an out-of-scope filter 116 determines when a request is out-of-scope for the generative AI service 110. For example, in the case the utterance is out-of-scope, a response from the generative AI service 110 may be to display text such as "I don't understand your request" or "I'm sorry, I do not understand what you mean. Can you please provide me with more information or ask a specific question?"

In some examples, response evaluator 118 verifies that an answer generated by one or more generative AI models 112 was not generated in error (e.g., hallucinated) by using one or more techniques. The response evaluator 118 may utilize a textual overlap to determine if there is overlap between the answer and the retrieved passages. The response evaluator 118 may utilize a textual natural language inference interpretation to determine whether the answer contradicts the retrieved passages. Additionally, the response evaluator 118 may determine whether the answer generated from the generative AI model(s) 112 is not generated in error to the natural language question by using head, tail, and relation triples. Also, the response evaluator 118 may utilize a membership inference attack evaluation to determine whether the question is similar to a question asked previously generated and is in a training set of the generative AI model(s) 112 (e.g., decide to answer the question based on whether the question, or some derivative, was already in the training set). In some examples, the answer, if verified, receives a watermark where word patterns are generated into the answer which are unreadable by humans but may be used by the generative AI service 110 to determine that it generated the answer.

In some examples, a user uses device 190 (e.g., a smartphone, a computer, a smartspeaker, etc.) to input a request. The request may be textual, speech (where an automatic speech recognition service 150 captures the speech as text to provide to the generative AI service 110), etc. In some examples, a translation service 152 translates text from a first language to one or more different languages.

In some examples, the cloud provider network 100 includes a model training service 120 and/or a model hosting service 140. The model training service 120 may be used to train one or more of the models of the generative AI service 110. The model hosting service may be used to host one or more trained models. The generative AI service 110 may then call those models as needed.

The cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity-such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

Figure 3:
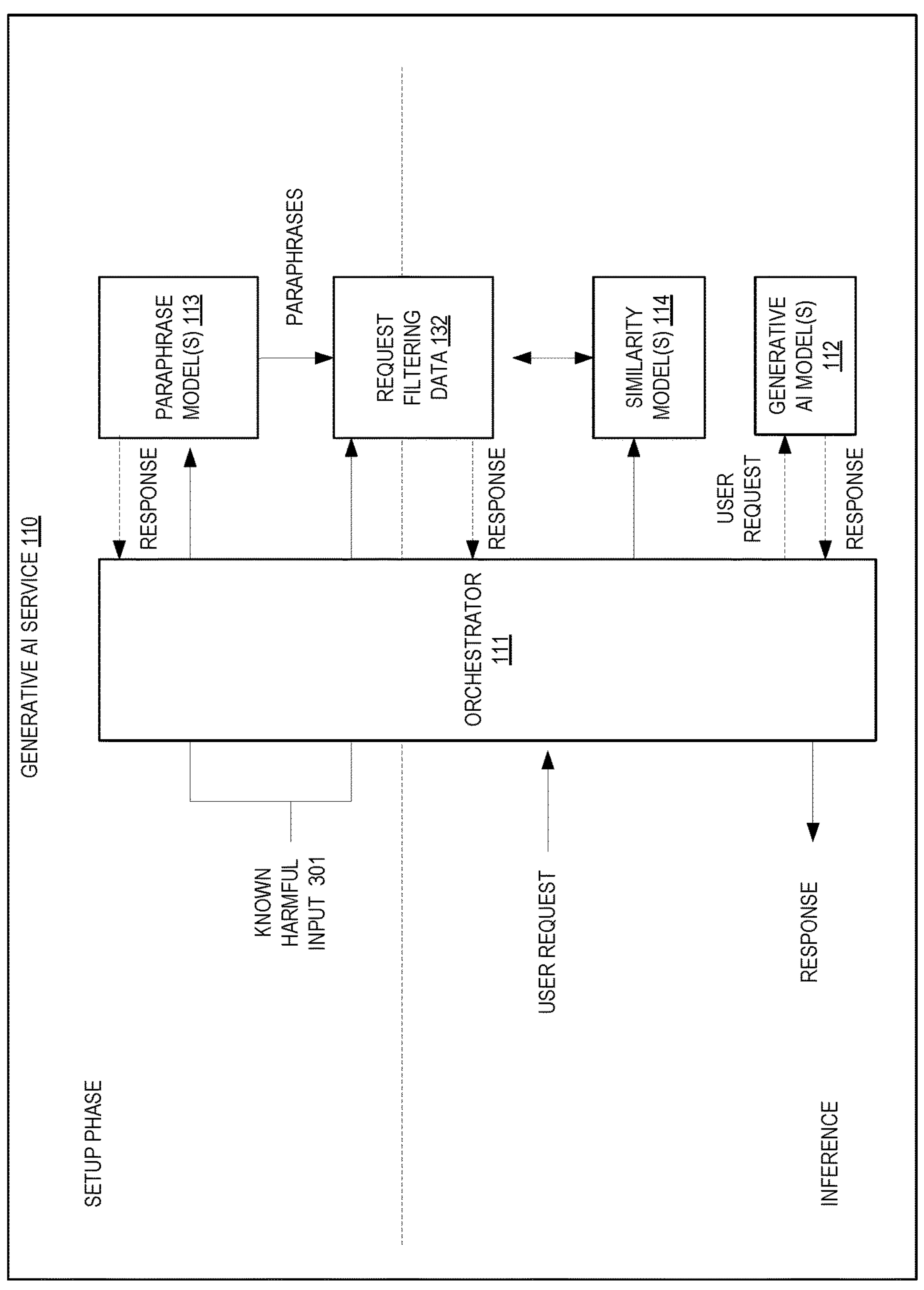
FIG. 3 illustrates examples of filtering potentially harmful generative AI results.

FIG. 3 illustrates examples of filtering potentially harmful generative AI results. This illustration shows a setup phase (above the dashed line) and an inference phase (below the dashed line). The setup and inference phases are under the control of an orchestrator 111 in some examples.

During setup, the generative AI service 110 receives known harmful input 301. Known harmful input 301 may come from different sources. Known harmful input could be learned from output of the generative AI model(s) 112. For example, as the generative AI model(s) 112 is/are used by end users the output of the generative AI model(s) 112 may be reviewed. This review could be done by system administrators, the users of the generative AI model(s) 112 (e.g., who report bad output), persons receiving the result(s), online postings describing the bad output, etc.

In some examples, a user provides the known harmful input 301 as a file that is accessible by the generative AI service 110. In some examples, the known harmful input is provided via a graphical user interface with a user providing one or more known harmful input(s).

The known harmful input 301 is provided to one or more paraphrase model(s) 113 to generate a collection of paraphrases per input. The one or more paraphrase model(s) 113 try to maintain the semantic meaning of the known harmful input phrases. In some examples, at least one of the one or more paraphrase model(s) 113 is Transformer-based (e.g., a T5 model, a BART model, etc.). In some examples, an orchestrator 111 provides the known harmful input 301. In some examples, the number of generated paraphrases is a tunable parameter of the generative AI service 110. In some examples, the generated paraphrases span a plurality of languages.

Figure 4:
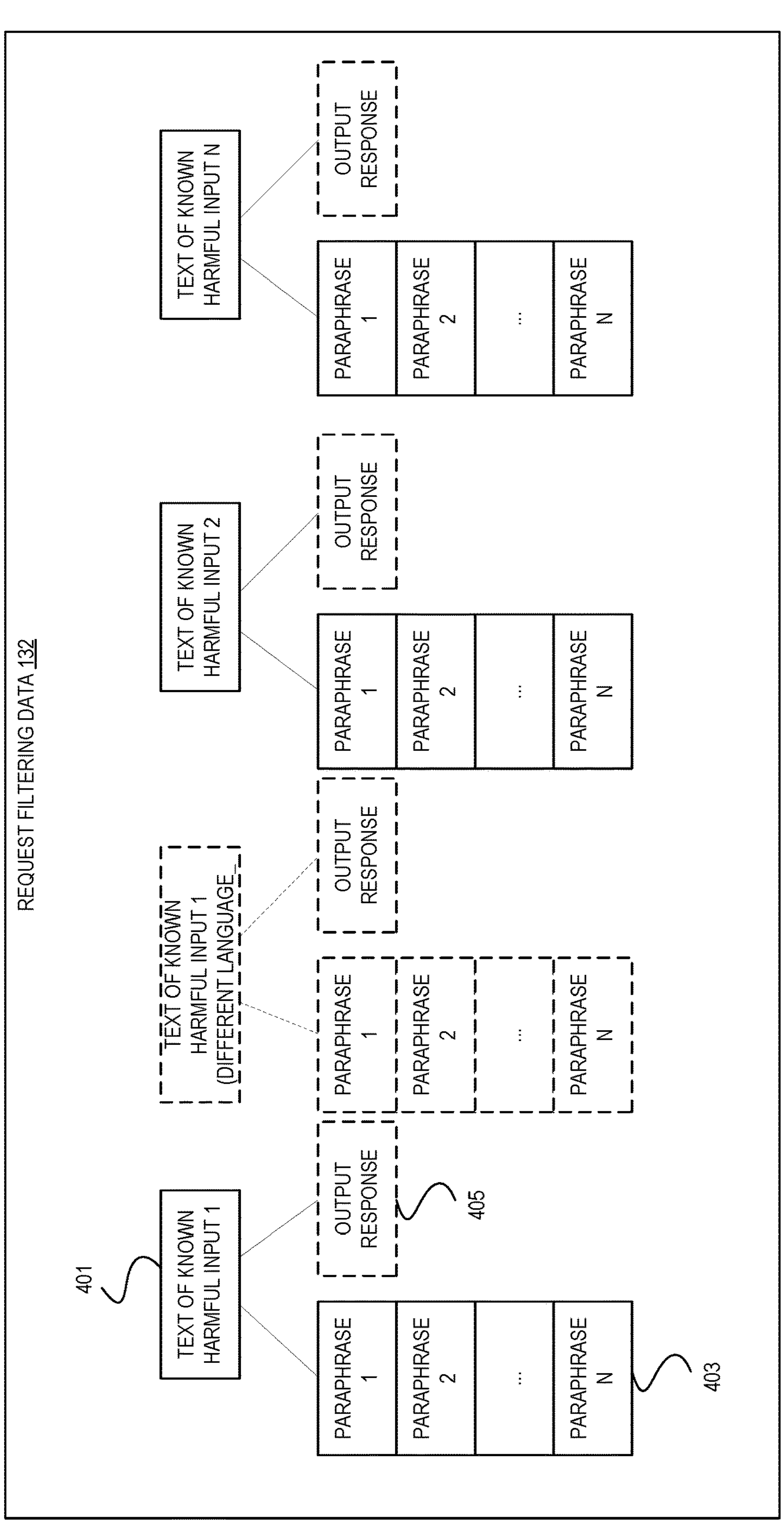
FIG. 4 illustrates examples of request filtering data.

The generated paraphrases are stored as request filtering data 132 along with the known harmful input 301. FIG. 4 illustrates examples of request filtering data. As shown, the text of a known harmful input 401 is associated with one or more associated paraphrases 403. In some examples, the paraphrases that have been generated based on the text of the known harmful input 401. For example, known harmful input there is a corresponding mapping to paraphrases. Note that a user may, in some examples, manually edit or generate paraphrases. In some examples, one or more of the paraphrases can be disabled/enabled. In some examples, a default output response 405 is also associated with a known harmful input.

In some examples, the request filtering data 132 includes one or more translations of text of known harmful input(s). For example, a translation from English to Spanish, etc. Paraphrases may be also be translated or generated from the translated known harmful input.

Figure 5:
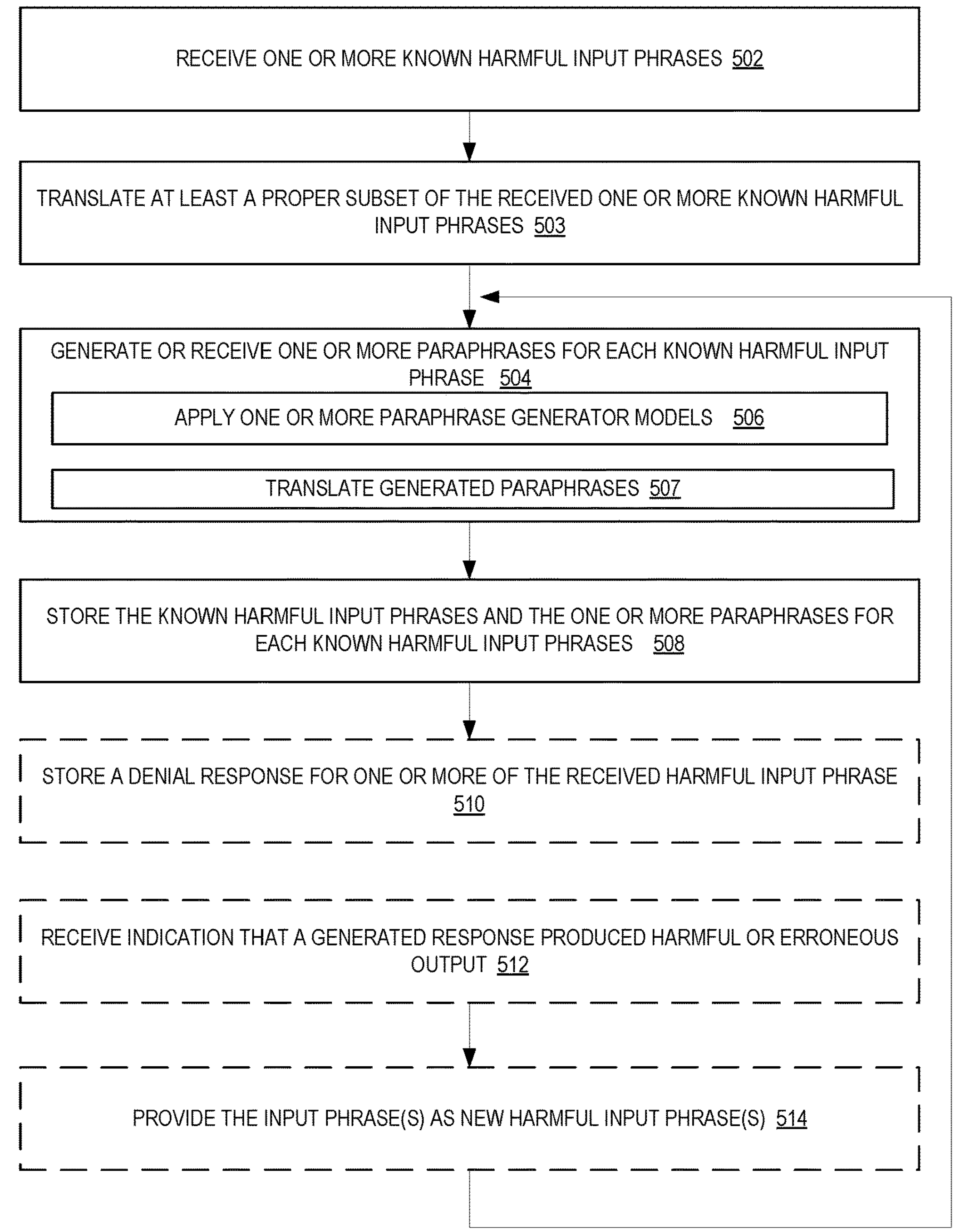
FIG. 5 is a flow diagram illustrating operations of a method for the setting up of a generative AI service according to some examples.

FIG. 5 is a flow diagram illustrating operations of a method for the setting up of a generative AI service according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by aspects of the generative AI service 110 of the other figures.

At 502 one or more known harmful input phrases is received. These known harmful input phrases are stored in the request filtering data 132. One or more known harmful input phrases may be received from a graphical user interface, as a part of a file, as a part of an application programming interface (API) call, etc.

FIG. 6 illustrates examples of a graphical user interface (GUI) for updating known harmful input. The "update" may be to a set of existing known harmful input or a new set of known harmful input. In this illustration, a user provides information 601 including one or more of the source location of a known harmful input text file, a version number for that input text file, and/or a destination location for the known harmful input text file.

A user may also provide information 603 about which paraphrase AI model to use to generate paraphrases (if allowed).

In some examples, a user provides an indication of language information 605 such as a source language to translate from and one or more desired languages to translate to.

At 503 at least a proper subset of the received one or more known harmful input phrases are translated into one or more different languages. In some examples, the translation service 152 provides the translation.

One or more paraphrases are generated or received for each known harmful input phrase at 504. In some examples, one or more paraphrase model(s) 113 generate these paraphrases at 506 and try to maintain the semantic meaning of the known harmful input phrases. In some examples, at least one of the one or more paraphrase model(s) 113 is Transformer-based (e.g., a T5 model, a BART model, etc.). In some examples, an orchestrator 111 provides the known harmful input 301. In some examples, the number of generated paraphrases is a tunable parameter of the generative AI service 110. In some examples, the generated paraphrases span a plurality of languages.

At 507 at least a proper subset of the one or more paraphrases are translated into one or more different languages. In some examples, the translation service 152 provides the translation.

The known harmful input phrases and the one or more paraphrases for each known harmful input phrases are stored at 508. For example, the request filtering data 132 is updated to include the known harmful input phrases and the one or more paraphrases. In some examples, the stored known harmful input phrases are used to fine-tune one or more of the generative AI model(s) 112.

In some examples, a denial response for one or more of the received harmful input phrase is received and stored at 510. For example, a user may provide a canned response to one or more of the known harmful phrases.

In some examples, generated responses from a generative AI model cause an update to the known harmful phrases and/or paraphrases. For example, an indication that a generated response produced harmful or erroneous output may be received at 512. The input phrase(s) that caused this output are provided to the generative AI service 110 as one or more new harmful input phrase(s) at 514 and one or more paraphrases are generated for the one or more new harmful input phrase(s) at 504, etc.

During inference, a user request is received. The request is compared to the known harmful input phrases and/or associated paraphrases to determine if the user request is acceptable or not. If the request is similar to a known harmful input phrase or an associated paraphrase it is not presented as is to the generative AI model(s) 112.

In some examples, this comparison is performed using one or more similarity model(s) 114 over all of the known harmful input phrases and associated paraphrases. In some examples, the comparison is multi-stage. In a first stage, the request is compared to stored known harmful input phrases of the request filtering data 132 using one or more input similarity models 114 using a first similarity threshold. If the request is sufficiently similar to a known harmful input phrase, then a response denying the request is sent to the requester. The response may be a default output response or could be a tailored response that is generated using the one or more paraphrase model(s) 113. In the first stage, the most similar known harmful input(s) (e.g., within a (tunable) distance from the request) are noted.

In a second stage, the request is compared to paraphrases associated with the most similar known harmful input(s). This prevents the need to compare user input to every paraphrase of every harmful phrase. If the request is sufficiently similar to a paraphrase, then a response denying the request is sent to the requester as above.

Figure 7:
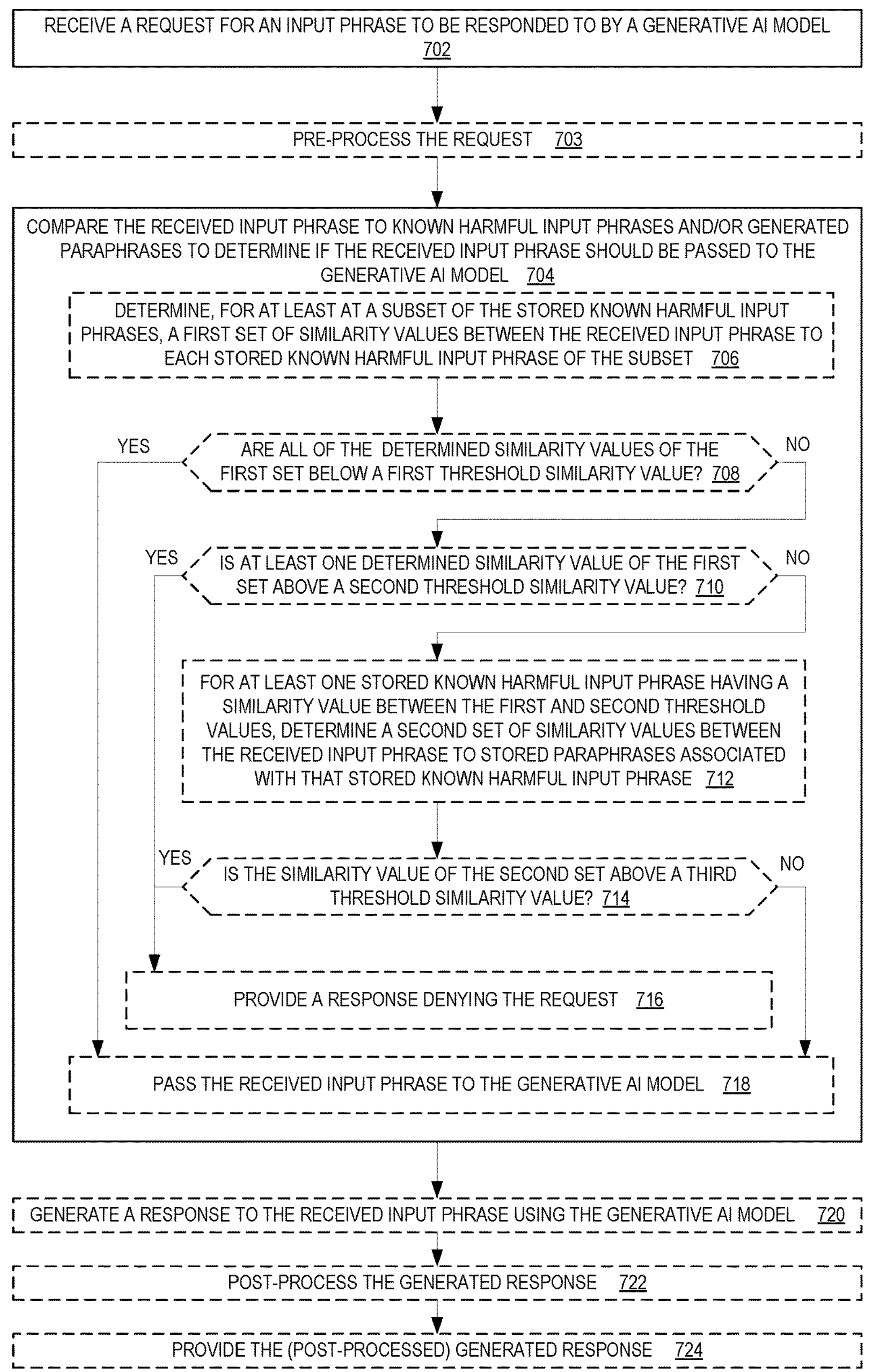
FIG. 7 is a flow diagram illustrating operations of a method for performing inference using a generative AI service according to some examples.

FIG. 7 is a flow diagram illustrating operations of a method for performing inference using a generative AI service according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the generative AI service 110 of the other figures.

A request for an input phrase to be responded to by a generative AI model is received at 702. The request may be text, audio, video, etc. depending on the implementation.

Figure 9:
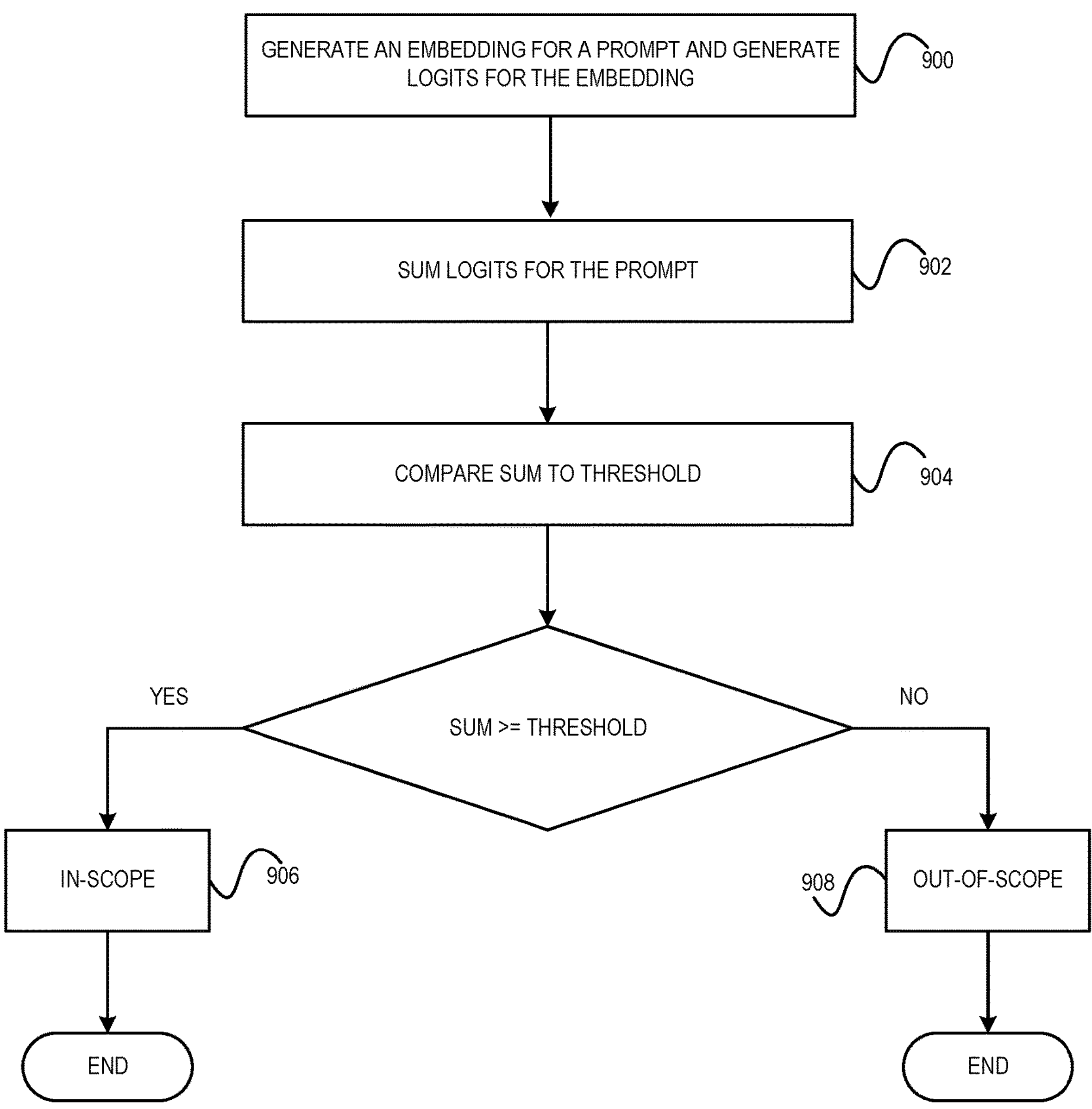
FIG. 9 is a flow diagram illustrating operations of a method for determining when a request is out-of-scope according to some examples.

In some examples, the request is pre-processed at 703. In particular, the request is subjected to an out-of-scope determination. In some examples, an out-of-scope filter 116 determines when a request is out-of-scope for the generative AI service 110. FIG. 9 is a flow diagram illustrating operations of a method for determining when a request is out-of-scope according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by aspects of the generative AI service 110 such as the out-of-scope filter 116 of the other figures.

In some examples, the out-of-scope filter 116 generates an embedding for the request (prompt) which is input to trained classifier to classifies the utterance producing classification logits as output representing the classification at 900.

The out-of-scope filter 116 then determines if the utterance is in-scope or out-of-scope by summing the logits in classification logits at 902 and comparing the sum to a predetermined threshold at 904. The sum represents a confidence of trained classifier than the utterance belongs to one of the in-scope classes. If the sum is greater than or equal to the predetermined threshold, then out-of-scope filter 116 determines that the utterance is in-scope at 906. Otherwise, if the sum is below the threshold, then the out-of-scope filter 116 determines that the utterance is out-of-scope at 908.

Alternatively, out-of-scope filter 116 can determine whether the utterance is in-scope or out-of-scope by comparing the in-scope logit to a predetermined threshold. For example, out-of-scope filter 116 can determine that the utterance is in-scope if the in-scope logit is greater than or equal to the threshold, and determine the utterance is out-of-scope otherwise.

As yet another alternative, out-of-scope filter 116 can determine whether the utterance is in-scope or out-of-scope by comparing the sum of the service classification logits to a first threshold and the in-scope logit to a second threshold. Out-of-scope filter 116 can then determine that the utterance is in-scope if the sum of the service classification logits is greater than or equal to the first threshold and the in-scope logit is greater than or equal to the second threshold, and determine the utterance is out-of-scope otherwise.

Thresholds used by out-of-scope filter 116 to determine whether an utterance is in-scope or out-of-scope based on classification logits may be selected according to the requirements of the particular implementation at hand. For example, a threshold can be selected empirically based on the results of the joint training. For example, a threshold can be selected that would corresponding to correct in-scope vs out-of-scope determinations for classification logits produced by a trained classifier for a mixed service set of validation utterances during a validation training phase.

In some examples, the pre-processing includes translating the request to a second language. The translated text may then be used in the comparisons below.

The received input phrase is compared to known harmful input phrases and/or generated paraphrases to determine if the received input phrase should be passed to the generative ai model at 704. This comparison may be done in several acts.

In some examples, a determination of a first set of similarity values between the received input phrase to at least a subset of the stored known harmful input phrases (in some cases each stored known harmful input phrase) is made at 706. In some examples, a similarity model is used.

A determination of if all of the determined first set of similarity values is below a first threshold similarity value is made at 708. In some examples, this threshold is configurable. In this determination, if none of the first set of similarity values meet the first threshold, then the request is determined to not be dissimilar enough to known bad inputs (and associated paraphrases) that it can be passed to the generative AI model at 718.

If, however, at least one of the first set of similarity values is at or above the first threshold value, then a determination of if at least one of the determined similarity values of the first set is above a second threshold similarity value is made at 710. If this is true, that means that the there does not need to be any more checking as the request is sufficiently similar enough to a harmful input phrase that it should be denied and a response denying the request provided at 716. This denial may be canned or generated using a paraphrase generator.

If the request is not so dissimilar to all known harmful inputs and is not so similar to at least one known harmful input that is deemed to also be harmful, for at least one stored known harmful input phrase having a similarity value between the first and second threshold values, a second set of similarity values is determined between the received input phrase and stored paraphrases associated with that at least one stored known harmful input phrase at 712.

A determination of if any similarity value of the second set is above a third threshold similarity value is made at 714. If not, then the request is passed to the generative AI model at 718. If yes, then a response denying the request provided at 716. This denial may be canned or generated using a paraphrase generator.

An example pseudocode for the use of thresholds is below where SV1 is the first similarity value (compared to the known bad inputs), SV2 is the second similarity value (compared to the paraphrases), TH1, TH2, and TH3 are the three thresholds respectively.

```
IF SV1≤TH1
  PASS TO GENERATIVE AI
IF SV1≥TH2
  DENY REQUEST
ELSE
  COMPARE TO PARAPHRASES
    IF SV2<TH3
      PASS TO GENERATIVE AI
    ELSE
      DENY REQUEST
```

A response to the received input phrase is generated using the generative Ai model at 720 in some examples.

In some examples, the generated response is post-processed at 722. For example, a response evaluation is performed by the response evaluator 118.

The (post-processed) generated response is provided at 724 in some examples.

Figure 8:
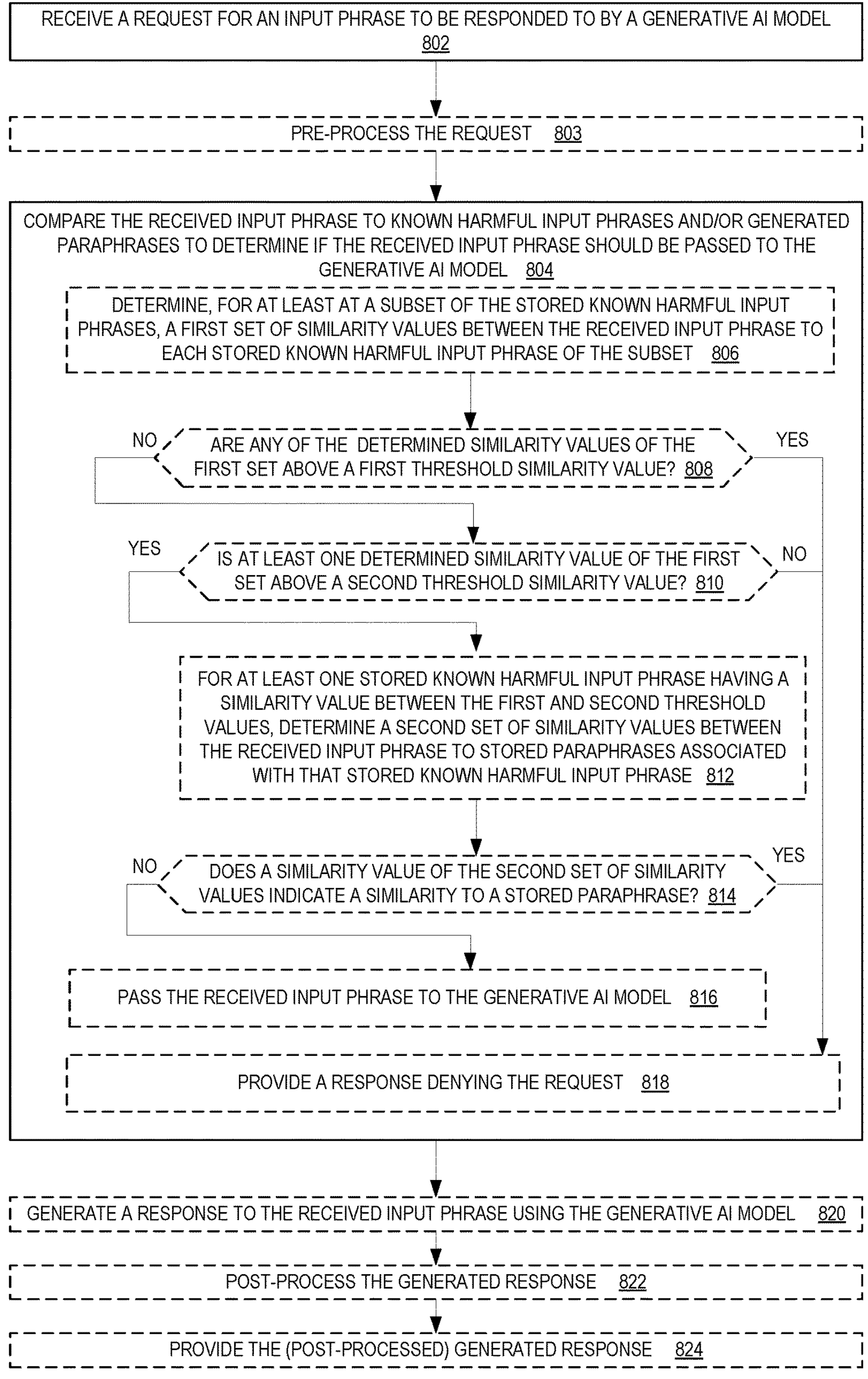
FIG. 8 is a flow diagram illustrating operations of a method for performing inference using a generative AI service according to some examples.

FIG. 8 is a flow diagram illustrating operations of a method for performing inference using a generative AI service according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the generative AI service 110 of the other figures.

A request for an input phrase to be responded to by a generative AI model is received at 802. The request may be text, audio, video, etc. depending on the implementation.

In some examples, the request is pre-processed at 803. In particular, the request is subjected to an out-of-scope determination. In some examples, an out-of-scope filter 116 determines when a request is out-of-scope for the generative AI service 110. FIG. 9 is a flow diagram illustrating operations of a method for determining when a request is out-of-scope according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by aspects of the generative AI service 110 such as the out-of-scope filter 116 of the other figures. In some examples, the pre-processing includes translating the request to a second language. The translated text may then be used in the comparisons below.

The received input phrase is compared to known harmful input phrases and/or generated paraphrases to determine if the received input phrase should be passed to the generative ai model at 804. This comparison may be done in several acts.

In some examples, a determination of a first set of similarity values between the received input phrase to at least a subset of the stored known harmful input phrases (in some cases each stored known harmful input phrase) is made at 806. In some examples, a similarity model is used.

A determination of if any of the determined first set of similarity values is above a first threshold similarity value is made at 808. In some examples, this threshold is configurable. In this determination, if at least one of the determined similarity values of the first set is above the first threshold, then a response denying the request is made at 818. If yes, then a response denying the request provided at 818. This denial may be canned or generated using a paraphrase generator.

If, however, at least one of the first set of similarity values is below the first threshold value, then a determination of if at least one of the determined similarity values of the first set is above a second threshold similarity value is made at 810. If this is not true, that means that the there does not need to be any more checking as the request is sufficiently similar enough to a harmful input phrase that it should be denied and a response denying the request provided at 818.

If the request is between the first and second thresholds then, for at least one stored known harmful input phrase having a similarity value between the first and second threshold values, a second set of similarity values is determined between the received input phrase and stored paraphrases associated with that at least one stored known harmful input phrase at 812.

A determination is made of if any similarity value of the second set indicates that the request is similar to a paraphrase 814. If not, then the request is passed to the generative AI model at 816.

A response to the received input phrase is generated using the generative Ai model at 820 in some examples.

In some examples, the generated response is post-processed at 822. For example, a response evaluation is performed by the response evaluator 118.

The (post-processed) generated response is provided at 824 in some examples.

Figure 10:
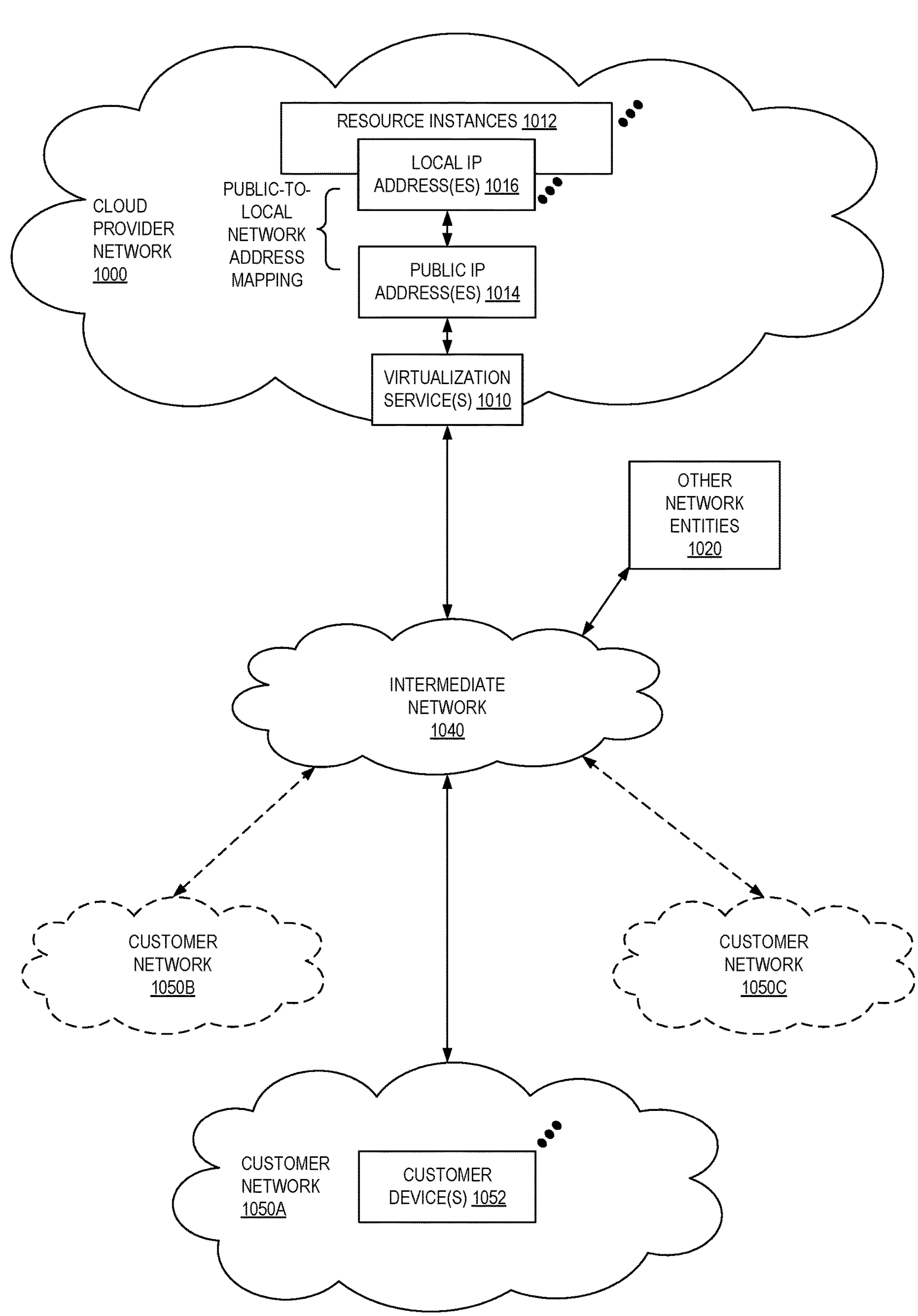
FIG. 10 illustrates an example cloud provider network environment according to some examples.

FIG. 10 illustrates an example provider network (or "service provider system") environment according to some examples. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some examples, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
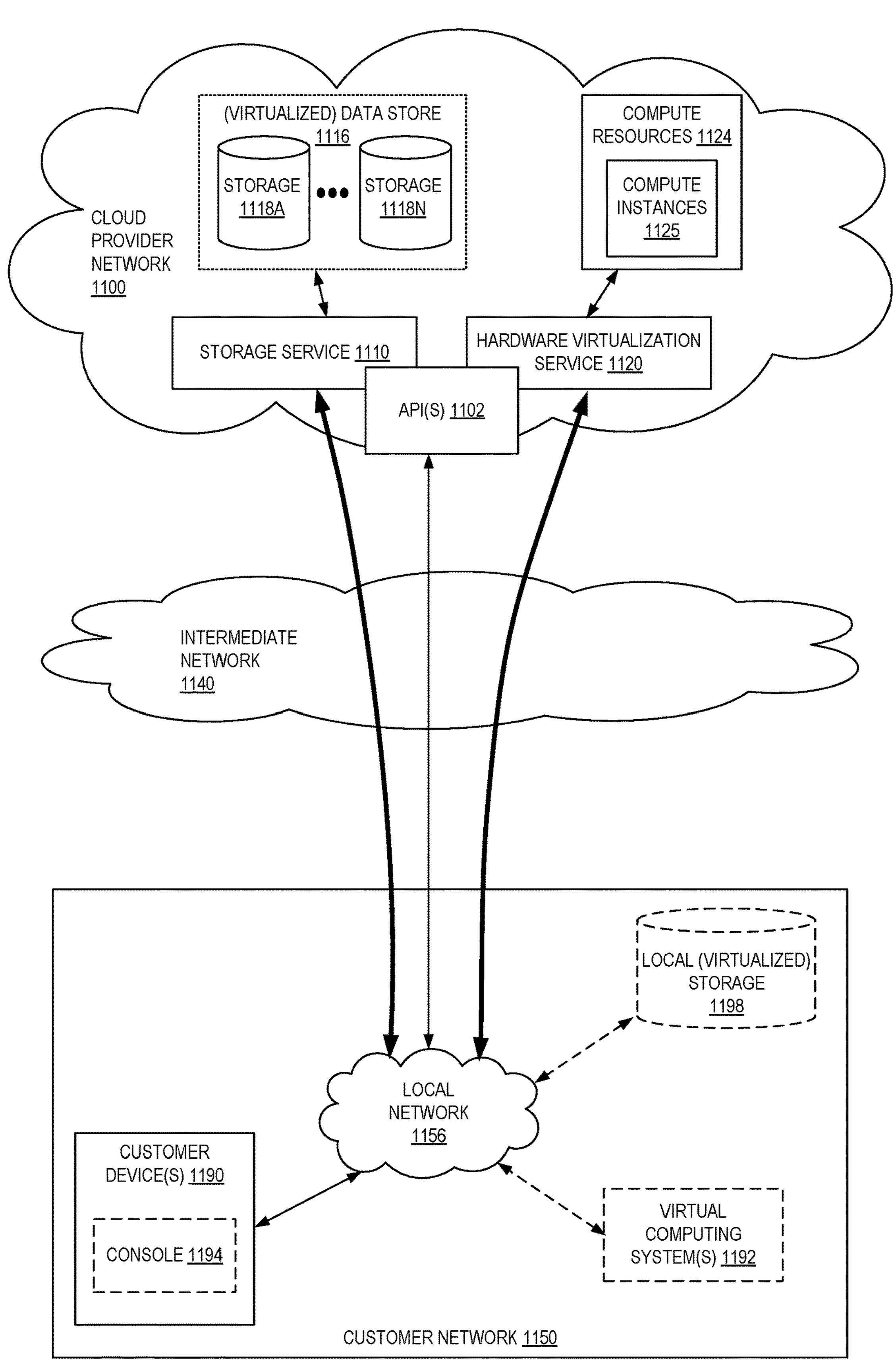
FIG. 11 is a block diagram of an example cloud provider network that provides a storage service and a hardware virtualization service to customers according to some examples.

FIG. 11 is a block diagram of an example provider network environment that provides a storage service and a hardware virtualization service to customers, according to some examples. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some examples, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some examples, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some examples, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some examples, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
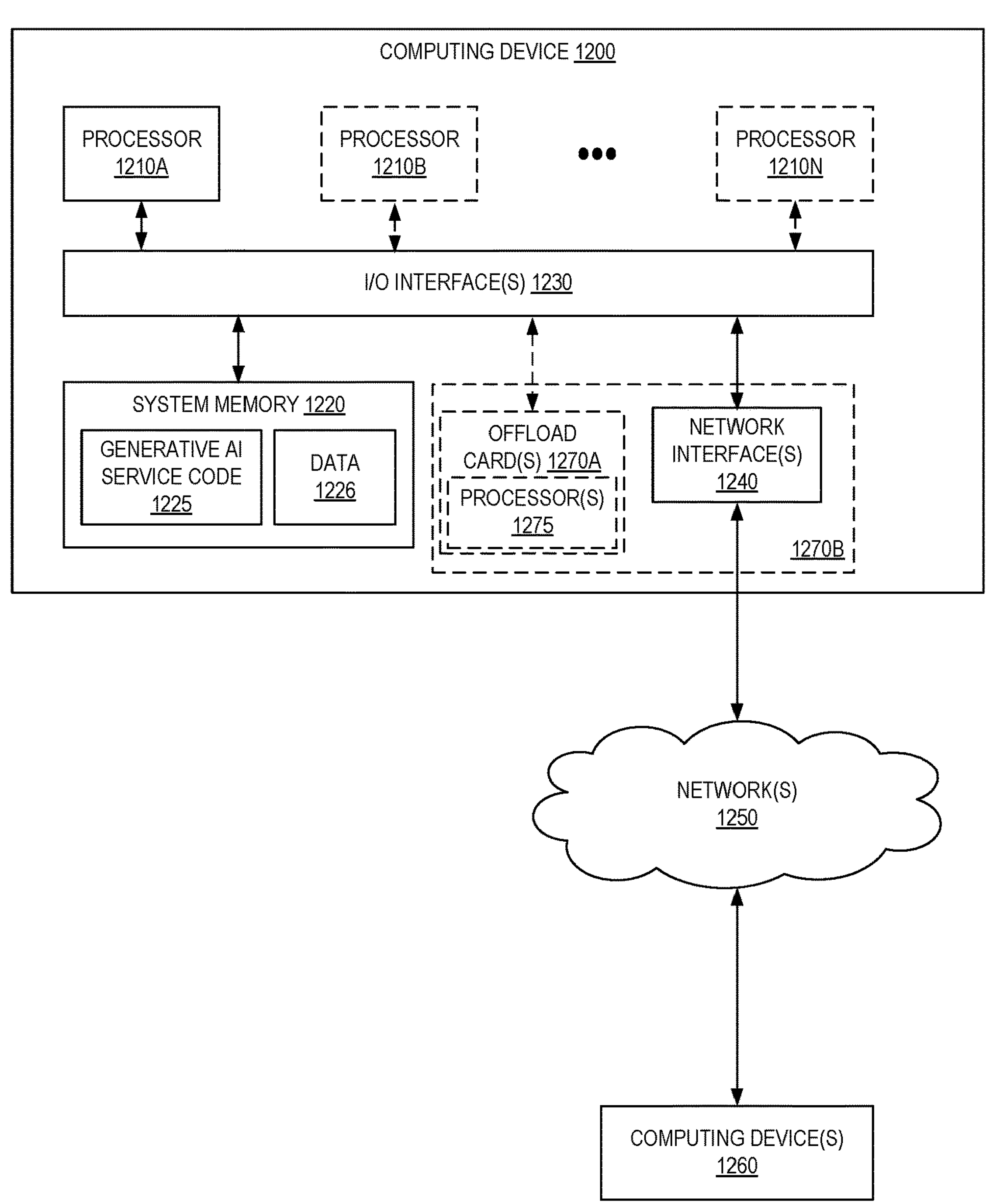
FIG. 12 is a block diagram illustrating an example computing device that can be used in some examples.

In some examples, a system that implements a portion or all of the techniques described herein can include a general-purpose computer system, such as the computing device 1200 (also referred to as a computing system or electronic device) illustrated in FIG. 12, that includes, or is configured to access, one or more computer-accessible media. In the illustrated example, the computing device 1200 includes one or more processors 1210 coupled to a system memory 1220 via an input/output (I/O) interface 1230. The computing device 1200 further includes a network interface 1240 coupled to the I/O interface 1230. While FIG. 12 shows the computing device 1200 as a single computing device, in various examples the computing device 1200 can include one computing device or any number of computing devices configured to work together as a single computing device 1200.

In various examples, the computing device 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various examples, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various examples, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1220 as generative AI service code 1225 (e.g., executable to implement, in whole or in part, the generative AI service 110) and data 1226.

In some examples, the I/O interface 1230 can be configured to coordinate I/O traffic between the processor 1210, the system memory 1220, and any peripheral devices in the device, including the network interface 1240 and/or other peripheral interfaces (not shown). In some examples, the I/O interface 1230 can perform any necessary protocol, timing, or other data transformations to convert data signals from one component (e.g., the system memory 1220) into a format suitable for use by another component (e.g., the processor 1210). In some examples, the I/O interface 1230 can include support for devices attached through various types of peripheral buses, such as a variant of the Peripheral Component Interconnect (PCI) bus standard or the Universal Serial Bus (USB) standard, for example. In some examples, the function of the I/O interface 1230 can be split into two or more separate components, such as a north bridge and a south bridge, for example. Also, in some examples, some or all of the functionality of the I/O interface 1230, such as an interface to the system memory 1220, can be incorporated directly into the processor 1210.

The network interface 1240 can be configured to allow data to be exchanged between the computing device 1200 and other computing devices 1260 attached to a network or networks 1250, such as other computer systems or devices as illustrated in FIG. 1, for example. In various examples, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some examples the offload card(s) 1270A or 1270B can perform compute instance management operations, such as pausing and/or un-pausing compute instances, launching and/or terminating compute instances, performing memory transfer/copying operations, etc. These management operations can, in some examples, be performed by the offload card(s) 1270A or 1270B in coordination with a hypervisor (e.g., upon a request from a hypervisor) that is executed by the other processors 1210A-1210N of the computing device 1200. However, in some examples the virtualization manager implemented by the offload card(s) 1270A or 1270B can accommodate requests from other entities (e.g., from compute instances themselves), and cannot coordinate with (or service) any separate hypervisor.

In some examples, the system memory 1220 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1118A-1118N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have." "having." and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
- receiving a request for an input phrase to be responded to by a generative artificial intelligence (AI) model;
- comparing the received input phrase to a known harmful input phrase that is most similar to the received input phrase and a paraphrase of a plurality of paraphrases associated with the known harmful input phrase in a multi-stage process to determine that the received input phrase is to be provided to the generative AI model, the comparing comprising:
  - generating a first set of similarity values between the received input phrase and the paraphrase; and
  - determining that the first set of similarity values is below a first similarity threshold;
- providing the received input phrase to the generative AI model; and
- generating a response based at least in part on an output of the generative AI model.

2. The computer-implemented method of claim 1, wherein comparing the received input phrase to the known harmful input phrase and the paraphrase associated with the known harmful input phrase in the multi-stage process to determine that the received input phrase is to be provided to the generative AI model further comprises:
- generating a second set of similarity values between the received input phrase and at least a subset of stored known harmful input phrases including the known harmful input phrase;
- determining that the second set of similarity values is below a second similarity threshold; and
- determining that the second set of similarity values is above a third second similarity threshold.

3. The computer-implemented method of claim 1, wherein the received input phrase is in a format of one of text, audio, or video.

4. A computer-implemented method comprising:
- receiving a request for an input phrase to be responded to by a generative artificial intelligence (AI) model;
- comparing the received input phrase to at least one paraphrase associated with a known harmful input phrase that is most similar to the received input phrase to determine that the received input phrase is to be provided to the generative AI model, the comparing comprising:
  - generating a first set of similarity values between the received input phrase and the at least one paraphrase associated with the known harmful input phrase that is most similar to the received input phrase; and
  - determining that the first set of similarity values is below a first similarity threshold;
- providing the received input phrase to the generative AI model; and
- generating a response based at least in part on an output of the generative AI model.

5. The computer-implemented method of claim 4, further comprising:
- comparing the received input phrase to at least one known harmful input phrase to determine that the received input phrase is to be provided to the generative AI model by:
- generating a second set of similarity values between the received input phrase and at least a subset of stored known harmful input phrases; and
- determining that the second set of similarity values is below a second similarity threshold.

6. The computer-implemented method of claim 5, wherein comparing the received input phrase to the at least one known harmful input phrase to determine that the received input phrase is to be provided to the generative AI model further comprises:
- determining that the second set of similarity values is above a third similarity threshold.

7. The computer-implemented method of claim 6, wherein at least one of the first, second, and third similarity thresholds are user configurable.

8. The computer-implemented method of claim 6, wherein comparing the received input phrase to the at least one known harmful input phrase to determine that the received input phrase is to be provided to the generative AI model further comprises:
- determining that none of the second set of similarity values is above the second similarity threshold and is above the third similarity threshold;
- generating a third set of similarity values between at least a proper subset of stored paraphrases associated with one or more of the stored known harmful input phrases; and
- determining that none of the third set of similarity values indicates that the received input phrase is similar to the at least proper subset of stored paraphrases associated with the one or more of the stored known harmful input phrases.

9. The computer-implemented method of claim 4, further comprising:
- receiving one or more known harmful input phrases including the known harmful input phrase;
- generating one or more paraphrases for each known harmful input phrase of the one or more known harmful input phrases using one or more paraphrase generator models; and
- storing the one or more known harmful input phrases and the generated one or more paraphrases for each known harmful input phrase of the one or more known harmful input phrases.

10. The computer-implemented method of claim 9, further comprising:

storing a denial response for one or more of the received one or more harmful input phrases.

11. The computer-implemented method of claim 4, further comprising:

verifying the output of the generative AI model is not a hallucination.

12. The computer-implemented method of claim 4, further comprising:

determining that the received input phrase is not out-of-scope, the determining comprising:

generating an embedding for the received input phrase to produce classification logits;

summing the logits in classification logits; and comparing the sum to an out-of-scope threshold, wherein when the sum is greater than or equal to the out-of-scope threshold the received input phrase is not out-of-scope.

13. The computer-implemented method of claim 4, wherein the received input phrase is in a format of one of text, audio, or video.

14. The computer-implemented method of claim 4, wherein the generative AI model is one of a Transformer-based model, a generative adversarial network, or an auto-regressive convolutional neural networks (AR-CNN).

15. The computer-implemented method of claim 4, further comprising:

translating the received input phrase to a different language and using the translation as the received input phrase.

16. A system comprising:

a first one or more computing devices to implement a storage service in a multi-tenant provider network; and a second one or more computing devices to implement a generative artificial intelligence (AI) service in the multi-tenant provider network, the generative AI service including instructions that upon execution cause the generative AI service to: receive a request for an input phrase to be responded to by a generative AI model;

compare the received input phrase to at least one paraphrase associated with a known harmful input phrase that is most similar to the received input phrase, wherein the known harmful input phrase is to be stored by the storage service, the comparing to determine that the received input phrase is to be provided to the generative AI model, the comparing comprising:

generating a first set of similarity values between the received input phrase and the at least one paraphrase associated with the known harmful input phrase that is most similar to the received input phrase; and determining that the first set of similarity values is below a first similarity threshold;

provide the received input phrase to the generative AI model; and generate a response based at least in part on an output of the generative AI model.

17. The system of claim 16, wherein the generative AI service is further to compare the received input phrase to at least one known harmful input phrase.

18. The system of claim 16, wherein the generative AI service is further to verify the output of the generative AI model is not a hallucination.

19. The system of claim 16, wherein the generative AI model is one of a Transformer-based model, a generative adversarial network, or an auto-regressive convolutional neural networks (AR-CNN).

20. The system of claim 16, wherein the received input phrase is in a format of one of text, audio, or video.

* * * * *